(12) United States Patent
Austin et al.

(10) Patent No.: US 6,549,906 B1
(45) Date of Patent: Apr. 15, 2003

(54) SYSTEM AND METHOD FOR ELECTRONIC DATA RETRIEVAL AND PROCESSING

(75) Inventors: Michael E. Austin, Roanoke, VA (US); Scott D. Waun, Blacksburg, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,126

(22) Filed: Nov. 21, 2001

(51) Int. Cl.[7] .............................................. G06F 17/30
(52) U.S. Cl. ......................... 707/10; 707/507; 707/508
(58) Field of Search ............................ 707/10, 3, 505, 707/506, 507, 508; 345/780; 709/246

(56) References Cited

U.S. PATENT DOCUMENTS

| | | | | |
|---|---|---|---|---|
| 5,495,565 A | * | 2/1996 | Millard et al. .............. 707/506 |
| 5,608,874 A | | 3/1997 | Ogawa et al. ............... 709/246 |
| 5,704,029 A | * | 12/1997 | Wright, Jr. ................... 707/505 |
| 5,758,126 A | | 5/1998 | Daniels et al. ............... 345/780 |
| 6,192,380 B1 | * | 2/2001 | Light et al. .................. 707/505 |
| 6,199,079 B1 | * | 3/2001 | Gupta et al. ................. 707/507 |
| 6,363,376 B1 | * | 3/2002 | Wiens et al. .................... 707/3 |
| 6,434,568 B1 | * | 8/2002 | Bowman-Amuah .......... 707/10 |

* cited by examiner

*Primary Examiner*—Sanjiv Shah
(74) *Attorney, Agent, or Firm*—Hunton & Williams

(57) ABSTRACT

A system and method for electronic data retrieval and processing is provided. The system includes a computer for retrieving customer-formatted data and converting the customer-formatted data into expanded data sets. The conversion may be performed by comparing the content of the customer-formatted data to supplier data, and may also include a comparison with customer profiles. The customer-formatted data sets contain incomplete requests, and the expanded data contain complete requests.

24 Claims, 4 Drawing Sheets

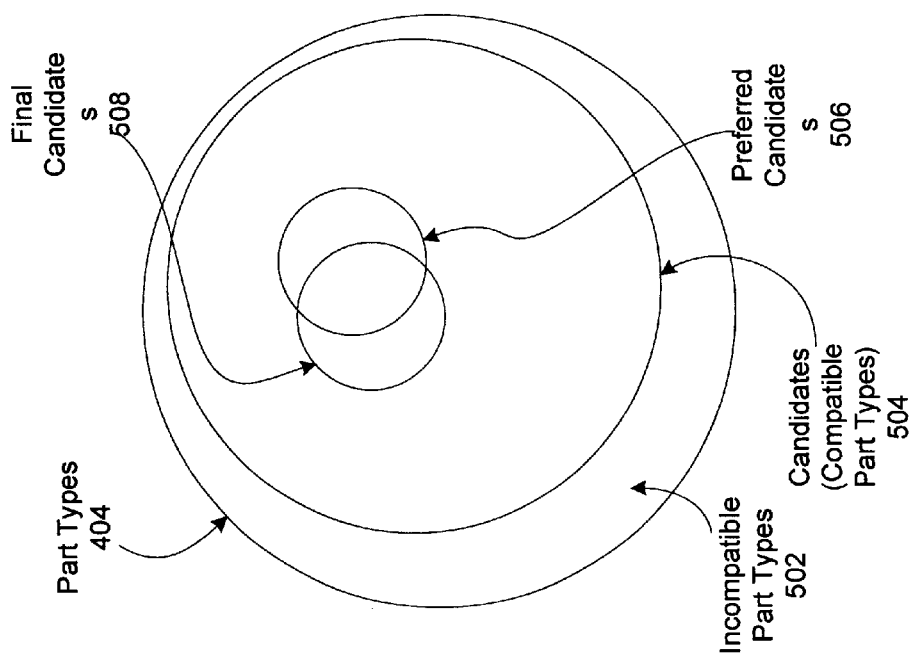

US 6,549,906 B1

SYSTEM AND METHOD FOR ELECTRONIC DATA RETRIEVAL AND PROCESSING

BACKGROUND OF THE INVENTION

The present invention relates generally to electronic form processing. More particularly, the present invention relates to a system and method for processing electronic forms that includes a value-added data conversion.

Electronic commerce often benefits from electronic file sharing. One type of electronic file that is commonly exchanged between companies is a purchase order or service request. Purchase orders are often used when a customer company wants to purchase products from a vendor company. For typical purchase orders, the customer determines or selects desired products or services and places this order or request into a paper or electronic format. The customer may be assisted in identifying the required goods by referring to supplier and vendor catalogs or databases. When electronic commerce is used, the vendor must be able to understand the electronic file containing the customer"s request. That is, the vendor must be able to recognize the customer"s electronic data file as a purchase order, and must be able to properly interpret the contents of the electronic file.

A common way of enabling businesses to communicate using electronic commerce is to employ a data translator. Businesses use a diverse selection of electronic communications formats for their internal work, and each business is likely to have a different preferred format. Data translators convert the internal language used by one business into a language usable by another business.

One type of data translator is an Electronic Data Interchange (EDI) system. EDI systems seek to provide a universal language to serve as an intermediary between the many diverse formats used by businesses. A typical EDI system uses a two-step process: first the EDI system translates data having the format of a first business into EDI data, a universal language that may be converted into other formats; and second, the EDI (or whatever performs the translation) translates the EDI data into the second business"s preferred format. The second step typically may be performed when a second business (using a different preferred data format for its own internal purposes) wishes to access the first business"s data, or when the first business wishes to send its data to a second business. Thus, an EDI system uses two translators: one to translate the first business"s language into EDI data, and a second to translate the EDI data into the second business"s language.

One drawback of an EDI system is that it requires multiple data translations, which may be difficult to implement and may increase the likelihood for error. Often, both the first and second businesses must have EDI compatibility, and it may be incumbent upon the sending party to ensure that its internal preferred format is translated into an EDI format that is readable by the intended recipient. In addition, such systems often rely on outside vendors to provide the EDI software and to perform the actual EDI translation, which may be costly.

In some circumstances, businesses may find it unnecessary to use an EDI system to communicate with one another. For example, if two businesses have a continuous interchange of information that does not require communications to other parties, then a direct translation from the preferred format of the first business to the preferred format of the second business may be more economical, less complex, and less prone to errors than an EDI system. An EDI system may also be unnecessarily complex and expensive when a single vendor only needs to convert a variety of customers" different data formats into its own preferred format. In such a case, there is no need to translate the different customers" different preferred formats into a universal format that may be read by anyone, because only the vendor will read the data. In this case, the vendor may wish to employ direct translators between itself and each customer.

EDI systems and direct translators typically provide a direct translation of the content of the data having the first businesses format into the second business"s format. Such a translation is similar to a linguistic translation, in which a word is simply changed from one language into another. For example, using a conventional system, when a customer business transmits a purchase order having a set of items to a vendor business, the vendor business will receive exactly the same list that was provided by the customer (albeit, translated into a format readable by the vendor business). With such systems and translators, the customer bears the burden of transmitting a complete and thorough message to the vendor.

In some purchasing environments, such as the context of purchasing equipment having multiple parts or subassemblies, both the purchasing customer and the equipment manufacturer may have difficulty using existing data translation systems. In some cases, a purchaser will not be able to determine exactly what product is appropriate for the customer"s needs. For example, a purchaser of a complex mechanical or electrical device, such a turbine control system, may have difficulty determining exactly how to specify the desired product in a purchase order. Such a customer may have such a complex variety of other assemblies, parts or systems with which the desired product must be compatible, that the customer would essentially have to design the desired product from the ground up. When such a customer desires to create an appropriate purchase order, the customer will have to enter all of the required parts of the desired product in meticulous detail. The vendor or manufacturer will then have to manipulate the list of parts to create an appropriate manufacturing schedule with the required shipping dates. In such cases, the vendor or manufacturer, who may have more experience and capability to design the appropriate system, may wish to offer these design services to the customer in a simple format requiring reduced customer effort.

It would be desirable to provide a method and system for translating data from one format to a second format without employing unnecessary, complex, inefficient, or expensive translation devices or methods. It would also be desirable to provide a method and system for translating data that relieves the sender of the burden of formatting the data into a format that the recipient may use. It would further be desirable to provide a method and system for translating data that relieves the sender of the burden of sending unnecessarily detailed information in a message. It would also be desirable to provide a system for receiving a customer"s purchase request in a simplified format, expanding that simplified format into a detailed request, and directly converting that request into an efficient manufacturing schedule.

SUMMARY OF THE INVENTION

The present invention overcomes the problems discussed above, and provides additional advantages, by employing an electronic form processing system and method. The electronic form processing system uses one or more vendor computers adapted to communicate with at least one customer computer, and adapted to access supplier data. One or more storage devices contain customer-formatted data sets, and a retrieval agent retrieves customer-formatted data sets representing custom electronic form information from the customer computer. The customer electronic form information represents a incomplete request for products, services or the like. An expansion module converts the customer-formatted data sets and generates expanded data sets at least in part by referring to supplier data. The expanded data set represents an essentially complete request.

The electronic form processing system may also have one or more second storage devices having customer profile data stored on them. In order to generate the expanded data set, the system may further refer to the customer profile data. The first storage devices and at least one of the second storage devices may be the same storage device, and at least one of the first and second storage devices may be a remote storage device accessible by at least one vendor computer to obtain one or more customer-formatted data sets. At least one of the first and second storage devices may be at least partially operated by at least one customer computer.

The customer-formatted data sets associated with each of the customer computers may have a format unique to that customer computer. The customer-formatted data sets may comprise high level product requests and the expanded data may comprise one or more detailed product descriptions. The expanded data further may also comprise manufacturing scheduling information, pricing information, or shipping information.

The retrieval agent of the electronic form processing system may also be adapted to retrieve updated customer formatted data and the vendor computers may be adapted to alter the expanded data to at least partially conform with the updated customer-formatted data.

A method for upselling a customer purchase request is also provided. The method includes adapting one or more vendor computers to communicate with a customer computer, retrieving one or more customer-formatted data sets representing customer electronic purchase request form information from one or more storage devices, retrieving customer profile data from one or more second storage devices, obtaining supplier data, and converting the customer-formatted data into an expanded data set at least in part by referring to at least one of the customer profile data and the supplier data. The customer electronic form information comprises an incomplete request and the expanded data set comprises an essentially complete request having at least one optional feature.

BRIEF DESCRIPTION OF THE DRAWINGS

The present invention can be understood more completely from the following Detailed Description of exemplary embodiments and the accompanying drawings, in which:

FIG. 5 is a Venn diagram showing and embodiment of the relationship between part types, candidates, preferred candidates and final candidates.

DETAILED DESCRIPTION

Figure 1:
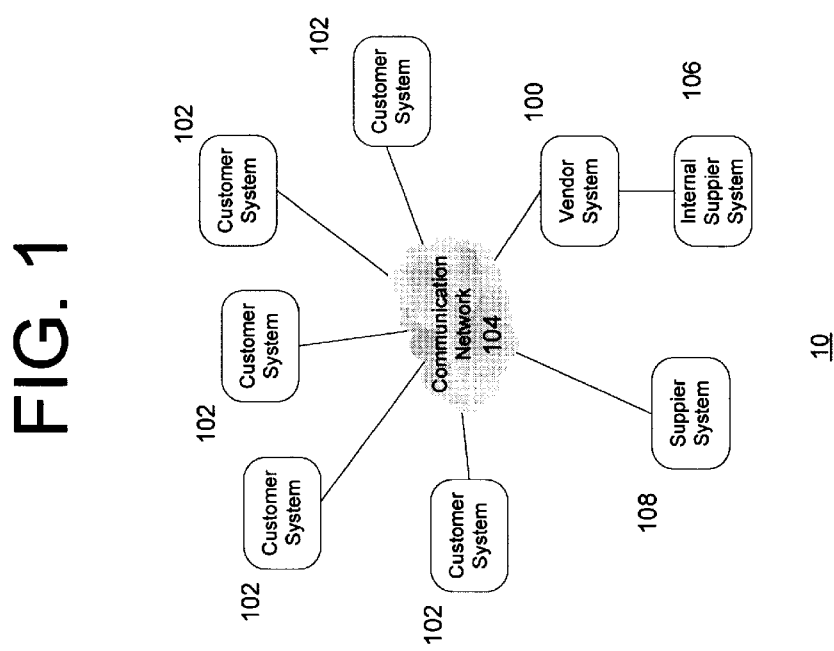
FIG. 1 is a schematic diagram of an embodiment of a communications network that may be used with the present invention.

Referring now to FIG. 1, the present invention generally operates in the context of a multi-party order management system 10, which may provide interlinked communications between various entities through one or more communication networks 104. The communication network 104 may comprise any system for transmitting data between various locations, and may be, include or interface with any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34 bis analog modem connection, a cable modem, an ATM (Asynchronous Transfer Mode) connection, or an FDDI (Fiber Distributed Data Interface) or CDDI (Copper Distributed Data Interface) connection. The communication network 104 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth, BlueTeeth or WhiteTooth radio link, or an IEEE 802.11 (or Wi-Fi)-based radio frequency link. The communication network 104 may further be, include or interface to any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection.

A vendor system 100 and one or more customer systems 102 are connected to one another through the communication network 104. The vendor system 100 and each of the customer systems 102 may have one or more interfaces that allow communication between the vendor system 100 or customer system 102 and the communication network 104. The vendor system 100 and each customer system 102 may comprise one or more workstations operating in an internally networked environment that extends within the vendor"s or customer"s business. Such an internally networked environment may comprise a plurality of personal computers, serving as workstations, connected to one another and to a server. The server may control the network and provide a communications link between the devices attached to the internal network and the communication network 104. The server may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

Workstations on the vendor system 100 and customer systems 102 may be or include, for instance, a personal computer running the Microsoft Windows™ 95, 98, Millenium™, NT™, 2000 or XP™, Windows™ CE™, PalmOS™, Unix, Linux, Solaris™, OS/2™, BeOS™, MacOS™, VAX VMS or other operating system or platform. Each workstation may include a microprocessor such as an Intel x86-based or Advanced Micro Devices x86-compatible device, a Motorola 68K or PowerPC™ device, a MIPS, Hewlett-Packard Precision™, or Digital Equipment Corp. Alpha™ RISC processor, a microcontroller or other general or special purpose device operating under programmed control. Each workstation may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art.

Other systems having similar features, such as an external supplier system 108, may be attached to the communication network. In addition, an internal supplier system 106 may be directly attached to the vendor system 100. In some cases, a vendor may be unable to provide the necessary goods or services to satisfy all of the vendor"s customer"s needs. In these cases, the vendor may outsource work to internal or external suppliers. The internal and external suppliers may interact with the vendor through internal and external supplier systems 106, 108, respectively.

Some or all of the systems may communicate with other systems on the communications networks 104 through a firewall 212. Firewalls 212 are electronic security checkpoints that prevent the unwanted flow of damaging or otherwise undesirable information. The design and implementation of firewalls 212 are generally known in the art.

The various systems 100, 102, 106, 108 may communicate with one another using any of a number of codes. For example, the systems 100, 102, 106, 108 may send or receive messages to one another using Internet Protocol (IP) or Internet Protocol Next Generation (IPng) code or data, Hyper-text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™, Common Gateway Interface (CGI), servelets, peer-to-peer networking code or other compilers, assemblers, interpreters or other computer languages or platforms.

The preceding descriptions of the communication network 104 and the various systems 100, 102, 06, 108 are not intended to limit the present invention. Communication networks 104 and systems operating in conjunction with them are generally known in the art, and a skilled artisan will be able to employ such systems in conjunction with the present invention without undue experimentation.

Figure 2:
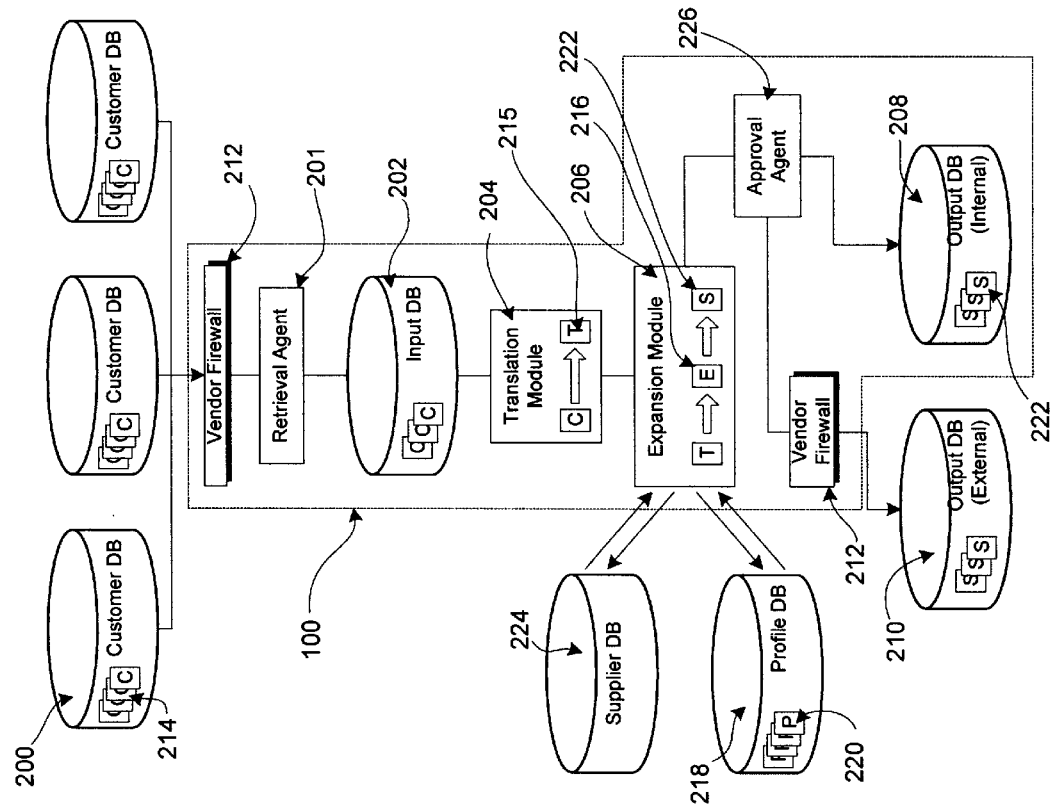
FIG. 2 is a schematic diagram of an embodiment of the present invention showing various systems and components of those systems.

Referring now to FIG. 2, an embodiment of the present invention generally comprises one or more customer databases 200, an input database 202, a translation module 204, an expansion module 206, and one or more internal or external output databases 208, 210. The input database 202, translation module 204, and expansion module 206 are all operated by the vendor and are part of the vendor system 100. The vendor system 100 may be separated from the customer databases 200 and external output databases 210 by one or more firewalls 212 to provide security to the vendor system 100.

In one embodiment of the invention, each customer database 200 is maintained by a customer of the vendor or an agent of the customer, and may reside on a customer system 102 or elsewhere. Typically, each customer has essentially unrestricted access to that customer"s customer database 200, and may add, modify or remove data on that database at any time. In another embodiment, the customer database or databases 200 may reside on the vendor system 100. Each customer database 200 is a repository for data that the customer wishes to make available to the vendor. Each customer database 200 may comprise any type of database, such as multidimensional databases or relational databases, and may be controlled by any software or operating system. Each customer database 200 may be, include or interface to, for example, an Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used or incorporated into each customer database 200. Furthermore, each customer database may have a different structure or utilize different data storage formats. To reduce customer inconvenience, each customer database 200 may be an existing database already in use by the customer.

Customer data sets 214 are stored in each customer database 200. Typically, a customer will find it most convenient to use a uniform format for all of its correspondence to outside vendors. For example, a customer may have a standard purchase order form that it will send to all of its vendors. Using a uniform format may help prevent errors associated with working with unfamiliar forms, improve customer convenience, reduce cost, and provide other benefits to a customer. Therefore, in order to provide convenience to customers, it is preferred that the customer data sets 214 stored in the customer database 200 be formatted according to the customer"s own preferred standards.

Formatting, as understood herein, refers to any method of data structuring. The customer data sets 214 may be formatted at several levels. At one level, the customer data sets 214 may be formatted according to the specific data storage protocols of the particular operating system used by the customer, such as IBM-compatible formatting or Mac-compatible formatting. At another level, customer data sets 214 may be formatted according to the file storage formats of particular software applications, such as Microsoft Access™, Microsoft Excel™, Adobe Acrobat™, Corel WordPerfect™, or other software formats, such as those described elsewhere herein, or according to the specific protocols of the customer"s database management software. At yet another level, the customer data sets 214 may be formatted according to the customer"s preferred data form. For example, in an embodiment in which the customer data set 214 represents a purchase order, the customer may list all part numbers in the first column, prices in the second column, and so on.

The customer database 200 is made accessible to the vendor such that the vendor can retrieve information from the customer database 200 at fixed times, upon request, or at will. Various methods of database access may be used. In one embodiment, the vendor has access to the customer database at all times through a trusted connection, such as password-protected connection of a direct line. Also, a vendor-operated retrieval agent 201 retrieves the customer data sets 214 from the customer databases 200 without any action on the part of the customers. The vendor-operated agent may be a software program adapted to utilize an Open DataBase Connectivity (ODBC) protocol or an equivalent protocol, such as those provided by Microsoft"s ODBC and Java"s JDBC. Such protocols are universal database manipulation tools that allow an agent to have external access to databases having a variety of database structures and operating systems that may not be locally supported by the entity that the agent serves.

In one particular embodiment, the vendor-operated retrieval agent 201 is a software program that automatically retrieves all of the customer data sets 214 from all of the customer databases 200 once per day, which may occur after the business hours of the customer. The retrieval time may also be selected to occur at other intervals, and may be timed to correspond with periods of low network use to maximize the speed at which the customer data sets 214 may be retrieved. The vendor-operated retrieval agent 201 may involve a human operator that manually provides directions for retrieving customer data sets 214 from customer databases 200 using a networked communication device, such as a networked computer terminal, or any other suitable system or device.

The vendor-operated retrieval agent 201 may further comprise various features to increase its usefulness or productivity. In one embodiment, the vendor-operated retrieval agent 201 may comprise a messaging system that sends one message to the customer upon each successful retrieval of a customer data set 214, and another message upon an unsuccessful retrieval. The vendor-operated retrieval agent 201 may also comprise a set of instructions for compressing data to minimize retrieval time. In addition, in order to ensure the security of the customer databases 200, the retrieval agent 201 may be supplied with security clearance information, such as a user name and password, to access the customer databases 200. Furthermore, the customer data sets 214 and other information may be encrypted to prevent interception of the data. Such security features are known in the art.

The vendor-operated retrieval agent 201, such as a software module, retrieves the customer data sets 214 and, in one embodiment, stores them in an input database 202 operated by the vendor. The input database 202 provides local storage on the vendor system 100 for customer data sets 214 retrieved from the one or more customer databases 200 until the customer data sets 214 can be processed, as is described in more detail herein. The customer data sets 214 may reside in the input database 202 in substantially the same format as when they were on the customer database 200, or they may be translated or otherwise processed during the retrieval process and reside in a vendor-selected format on the input database 202. In another embodiment of the invention in which the customer data sets 214 are processed immediately upon retrieval, the input database 202 may be omitted.

Each customer data set 214 is processed by the vendor system 100 from a relatively simple data set into a more detailed data set. The customer data sets 214 may comprise high-level customer requests that do not, on their own, contain enough information to direct the vendor how to proceed with fulfilling the request. In this sense, the customer data sets 214 may be considered incomplete requests. The vendor system 100 completes the customer data set 214 by processing it into a detailed data set that provides the vendor or the vendor"s suppliers with the details necessary to proceed with fulfilling the customer"s request. Once processed, the incomplete requests embodied in the customer data sets 214 become complete requests.

Using this system, the customer enjoys the benefits of being able to use a simple or familiar format for placing, for example, purchase orders. In such an embodiment, the customer may be able to express its needs at a high level, such as by using general parts descriptions. Also in such a system, the vendor, which may have a greater ability than the customer to identify the precise materials or services required to fulfill the customer"s generally expressed needs, may quickly and accurately convert the customer"s generally expressed needs into a detailed request for services or goods, both internally and to other suppliers or service providers.

The processing steps of the present invention convert each high level customer-formatted customer data set 214 into a more complex and detailed expanded vendor-formatted data set 216 that may be used by the vendor or the vendor"s suppliers. This process may be carried out in one or more steps. In one embodiment, the process comprises two main steps: first, the customer data sets 214 are translated by a translation module 204 into translated data sets 215, and second, the translated data sets are expanded by an expansion module 206 into usable expanded vendor-formatted data sets 216. Alternatively, these two steps may be done simultaneously by a single, integrated translation and expansion module residing in a processor on the vendor system 100. In any case, the steps are preferably performed by a software program or similar computer processing instructions.

The translation module 204 may be a software program that translates the customer data sets 214 into usable data. In many cases the customer data sets 214 will have to be translated into a recognized file format before the vendor can use them, although this may not always be required. The purpose of the translation module 204 is to process the customer data sets 214 into a readable, recognizable format. For example, a customer data set may simply be unreadable by the software that the vendor uses to manipulate data, necessitating a translation into a readable format. Also, in many cases the customer data sets 214 may contain information that is not in the order preferred by the vendor, such as when columns or rows of a data array are transposed. In such cases another translation may be necessary to reorder the data into the vendor"s preferred order.

In a typical translation, for example, a customer data set 214 may comprise a first string of data correlating to a series of part numbers, and a second string of data correlating to the prices for each of the part numbers. The vendor may prefer to format the data into a first string of data correlating to the first part number and its associated price, a second string of data correlating to the second part number and its associated price, and so on the translation module 204 would perform this reordering. Such translations are generally known in the art, and may be accomplished by a variety of methods, such as by using relational database tables, lookup tables or object-oriented databases.

In some cases, it may not be necessary to translate a particular customer data set 214, as it may already match a vendor"s preferred or acceptable format. In such cases, the translation module 204 may be skipped during the data processing, or may effectively result in a pass-through of data.

The translation module 204 provides an essentially direct translation of information. That is, the translated data sets 215 contain substantially the same information as the customer data sets 214 from which they are translated. For this reason, directly translated data has limited usefulness. For example, if a customer creates a customer data set 214 representing a purchase order having pre-defined variable fields of data, e.g., fields representing a part number, part price, and shipping date, then the translated data set 215 corresponding to this customer data set 214 will also contain only data fields representing the part number, part price, and shipping date, although the format of these data in the translated data set 215 may be different than the customer"s preferred format. The usefulness of each translated data set 215 is limited to the detail of the original data entered into the corresponding formatted data set 214.

Directly translated data may be useful to a vendor only if it provides sufficient detail to instruct the vendor how to respond. In the traditional purchase order model using paper forms, the vendor is able to respond only if the purchase order sufficiently identifies a specific part that the customer wishes to purchase. Usually such parts are identified by a specific name or number. Any problems with the paper form, such as inconsistencies or blank fields, may be addressed by a customer service representative, who reviews each paper form and enters the form into the vendor"s ordering or manufacturing system. For example, a customer service representative may need to clarify illegible writing or resolve a conflict between a part number and a non-matching part name or price. The customer service representative may do so by speaking with the customer, or by carefully examining the paper document.

When electronic forms are used, the job of rectifying discrepancies in the purchase order may be handled by a human customer service representative who reviews the electronic form, or by a computer-based software program that is designed to detect, report and rectify such discrepancies. In one embodiment of the invention, the translation module 204 comprises an error-checking feature. The error checking feature may identify, report and rectify typographical errors in the customer data, and may further comprise an automated query system that sends a message to a customer when an error has been identified and corrected. Such a feature may also identify and report when an error has been detected but can not be corrected. Examples of such errors include misspelled words, unidentifiable part numbers, incorrect prices, unusual order quantities, and the like. The translation module 204, or another part of the vendor system 100, may also comprise a human readable interface that allows a human customer service representative to check each customer data set 214 for errors. In many of these cases, however, the vendor may be unable to identify and correct anything but the most basic errors or omissions. Further, the system may determine those part numbers or features most likely to have been intended by the customer and forward a choice of possible selections to the customer when reporting the error.

Another feature of currently used purchasing systems is that the customer typically must choose from among the various items offered by the vendor to find the correct ones for the customer"s application. In some cases, this is a routine process requiring little effort on the customer"s behalf, but in other cases, this can be a difficult process, as the customer must try to identify features and aspects of the vendor"s products that are compatible, or incompatible, with the customer"s existing systems. Selecting parts may be a difficult process for the customer, and in many cases, a vendor"s customer service representative will have to work with the customer to identify particular features and aspects of the customer"s system before the proper parts may be identified. For example, a customer may seek to purchase a power system control unit that is suited for controlling various types of power generators and related apparatuses. The vendor may not have a product that meets the requirements of the various apparatuses, and one may have to be custom made. In such a case, the customer may have no reasonable way to determine how to specify the various parts necessary to assemble the desired product, and the vendor will have no way to assemble a suitable product without first obtaining an understanding of the customer"s system. In such cases, the customer service representative and the customer work together to determine exactly what the customer needs, which can be a timely and expensive process. In addition, once the proper set of necessary parts is identified, the customer must still enter all of these parts into a purchase order and transmit the order to the vendor, which may increase the likelihood of clerical errors or other mistakes, and increases the cost and inconvenience to the customer.

As noted elsewhere, the present invention allows customers to provide relatively general information about desired products or services, which the vendor system then converts into a more specific request. In order to allow customers having complex purchase requirements to easily purchase goods that are compatible with their systems, the present invention further comprises one or more profile databases 218. The profile databases 218 may be one or more vendor-operated or vendor-accessible databases that store customer profiles 220. The customer profiles 220 may also be stored in a network server system or other storage device, and may be hard-coded into the vendor system 110, such as by encoding the customer profiles 220 into the vendor system software. Each customer profile 220 contains information about a customer, such as information about the customer"s machinery, processes, systems or other data relevant to the vendor"s products or services. The profile database may use any format, or any access method, such as those described above, and may be maintained by the vendor, the customer, or a third party. The profile database 218 may be maintained by the vendor, so that the information may be held and accessed with relatively high security.

Each customer profile 220 comprises information necessary for the vendor to expand a relatively basic customer data set 214 into a detailed data set that may be used by the vendor system to process the customer"s transaction. A single customer, such as a large corporate entity having a multitude of departments, may have several customer profiles 220. In one embodiment, each customer"s profile 220 is established by the customer, vendor, or both at the beginning of the relationship between the customer and the vendor. For instance, a customer profile 220 may be established by a personal interview between a customer service representative and the customer. Alternatively, a customer profile 220 may be established by using an automated interviewing system, such as an interactive software program or an electronic form presented via a computer. For example, a computerized interviewing system may comprise a software program that is available via the Internet at a web site maintained by the vendor. Such a program may be downloadable by the customer for local use on the customer"s system, or may be operated interactively through the Internet. Customer profiles 220 may be updated as necessary to reflect changes to the customers" information, and may be updated to reflect transactions with the vendor. For example, a customer profile 220 may be updated to reflect that the customer"s inventory or facility has been updated or modified by equipment purchased from the vendor. In addition, the customer profiles 220 may also be updated when the vendor offers new or different products or services.

In an embodiment using Internet operation, the computer interviewing system may include a plurality of questions asked by the vendor system to which the customer provides answers. In order to minimize the possibility of typographical errors, the questions may have a yes or no format using check boxes for answers, or drop down lists having a fixed selection of answers may be used. Such interactive Internet applications are known in the art, and a skilled artisan will be able to employ such a system without undue experimentation.

The exact content of the customer profiles 220 may vary between applications, and also may vary between customers. For example, each customer profile 220 may comprise one or more customers" address and billing information. In addition, each customer profile 220 may comprise information about the customer"s operations, systems, machinery, or other information relevant to the vendor"s services of goods. For example, the customer profile 220 may identify the customer"s machinery type and model year, or may identify the customer"s manufacturing capabilities or limitations. It may also identify a set of preferences, such as the customer"s preferred upgrade packages. The customer profile 220 may also include information reflecting the vendor-customer relationship, such as information about particular rebates to which the customer is entitled.

The expansion module 206 of the present invention further processes the translated data 215 (which represents a direct translation of the relatively simplistic customer data set 214) into relatively detailed expanded vendor-formatted data sets 216 (expanded data sets). The expansion module 206 operates by comparing each translated data set 215 with a supplier database 224 to determine the exact requirements of each customer data set 214. In an embodiment, the expansion module 206 may also compare the translated data sets 215 with corresponding customer profiles 220 to determine the exact requirements of each customer data set 214. The operation of the expansion module 206 is described in more detail herein.

The supplier databases 224 are one or more databases maintained by the vendor system, a supplier system, or both. In some cases, the vendor may be the supplier, and in these cases there may be an institutional division between the vendor operations and the supplier operations, such as when a single company operates separate sales and supply entities. The general structure and features of such databases have been described elsewhere herein. The supplier data may also be stored in a medium other than a database, and may be hard-coded into software or programs residing on the vendor system 100 or any other system accessible by the vendor system 100. Typically, each vendor supplier will have a supplier database 224 or a portion of a supplier database dedicated to that vendor supplier. The supplier databases 224 may contain information about the products or services provided by the suppliers, like a detailed product catalog. Supplier databases 224 may be tailored to provide correlative data indicating the various features of each item or service offered by the supplier. This correlative data may be used, for example, to identify related parts and assemblies, and to determine which parts may be compatible or incompatible with one another. The supplier databases 224 may also contain information about the availability of parts or services, and may include a time schedule, such as a manufacturing schedule indicating idle and busy times. The supplier databases 224 may also be tailored to provide any other information about the supplier (or vendor, if the vendor is the supplier) that may be useful in the ordering process.

One overall objective of an embodiment of the present invention may be to convert a relatively general request for services or goods into a fully detailed request. That is, the embodiment converts a limited amount of information provided by the customer in a particular request into a request having enough detail for the vendor or supplier to proceed with fulfilling the request. One way to accomplish this goal is to adopt a methodology that uses the following basic steps, which may be followed or enacted in any logical order: (1) identify the discrete components of the customer"s request; (2) identify potential solutions to fulfill each discrete component of the request; (3) determine whether the potential solutions to each discrete component conflict with one another; and (4) resolve any conflicts by proposing new solutions by, for example, using an iterative solution technique, a simultaneous mathematical solution technique, or logical algebraic operations.

Such a methodology may incorporate data from other data sources to supplement the information provided in the customer"s request.

The following discussion demonstrates one method for providing such a methodology. Other solutions will be apparent to those skilled in the art in light of the teachings herein, and the present invention is not intended to be limited to the recited examples.

Figure 3:
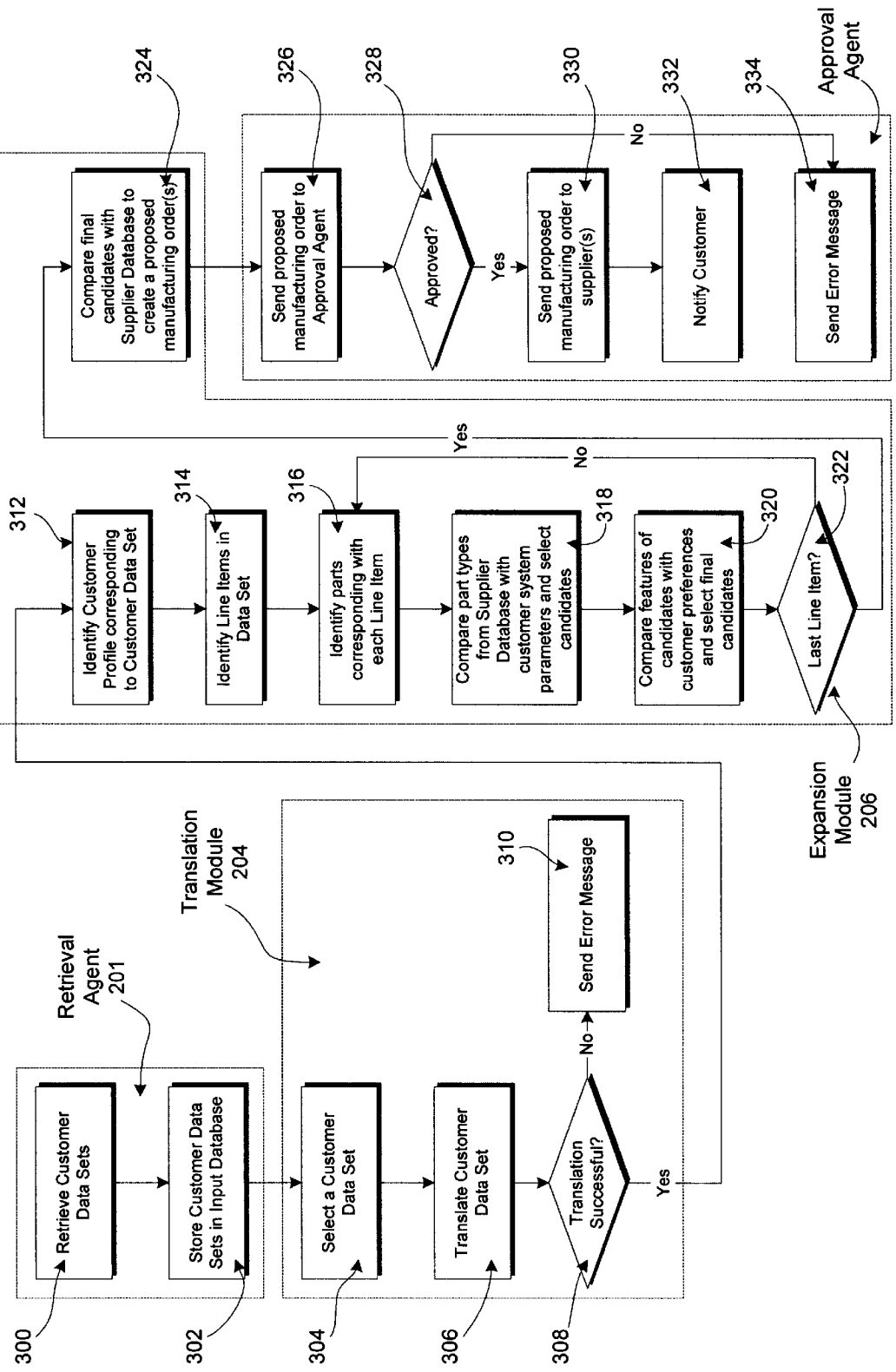
FIG. 3 is a flow chart of the data processing steps of an embodiment of the present invention.

By way of example, the operation of the present invention will be demonstrated by describing an embodiment of the invention in which each customer data set 214 represents a purchase order. In this embodiment, the customer data set 214 may list several assemblies or parts requested or specified in the purchase order. However, for purposes of this explanation the customer data set 214 will contain only one item: an industrial power system control panel 400 having parts 402 and optional features 406. This exemplary embodiment is for demonstrative purposes, and should not be understood to limit the invention. The operation will be described with particular reference to FIGS. 3 and 4.

The operation begins in step 300 when the retrieval agent 201 retrieves customer data sets 214 from one or more customer databases 200. As noted elsewhere, the retrieval may be performed at specific times, upon request, upon event occurrence, or according to some pre-defined schedule. The retrieval agent 201 retrieves the customer data sets 214 from customer maintained databases to minimize customer inconvenience and eliminate the need for the customer to transmit the customer data sets 214 to a remote database. However, the customer may place the customer data sets in any database to which the vendor system 100 has access.

In step 302, the retrieval agent 201 stores the retrieved customer data sets 214 in an input database 202, which has been discussed in detail herein. The retrieval agent 201 preferably stores the customer data sets 214 in a manner that identifies the source of each customer data set 214. For example, the retrieval agent 201 may store all data sets retrieved from a particular customer in a directory dedicated to that customer. The retrieval agent 201 may also place a unique identification tag on each stored file and add this identification tag to a reference directory for easy identification.

In step 304, the translation module 204 selects a customer data set 214 for processing. The selection process may be performed using any suitable algorithm, such as a first-in first-out process or a random selection procedure. In another embodiment, the translation module 204 may select several customer data sets 214 for processing simultaneously. Once selected, the customer data set 214 may be deleted from the input database 202, or more preferably, placed in another database for long-term storage or tagged as a processed data set. Ideally, the vendor or customer is able to access the tagged data sets in order to amend those purchase orders at a later date in accordance with customer instructions. Such amendments may be accomplished, for example, by indicating in a data set that the present data set is an addendum to a prior data set, and providing the vendor with a reference number to the prior data set.

In step 306 the translation module 204 translates the customer-formatted customer data set 214 into a vendor-formatted translated data set 215, as described elsewhere herein. The translated data set 215 may contain any identification tags that may have been placed on or associated with the untranslated customer data set 214 in order to track the source of the data. In one embodiment of the invention, the translation module 214 then uses error checking features to determine whether the translation was successful 308. Error checking may be accomplished by comparing the translated data set 215 to a template, by detecting unreadable or unidentifiable data string or field in the customer data set 214, or by any other suitable method known in the art. If the translation was not successful, then the translation module 204 sends an error message 310. The error message may be sent, for example, to one or both of the customer and the vendor, and may be received by a system administrator of either system. The error message may be a simple notification of it may include, for example, information that will help rectify problems with the data. Successfully translated data sets are further processed by the expansion module 206.

In step 312, the expansion module 206 identifies the customer profile 220 corresponding to the translated data set being processed 215. This may be accomplished, for example, by referring to the identification tag placed on the translated data set 215 in a prior step, by reference to a reference directory, by analyzing the content of the translated data set 215, or any other suitable means. Once the customer profile 220 is identified, the expansion module 206 may further process the translated data set 215.

Figure 4:
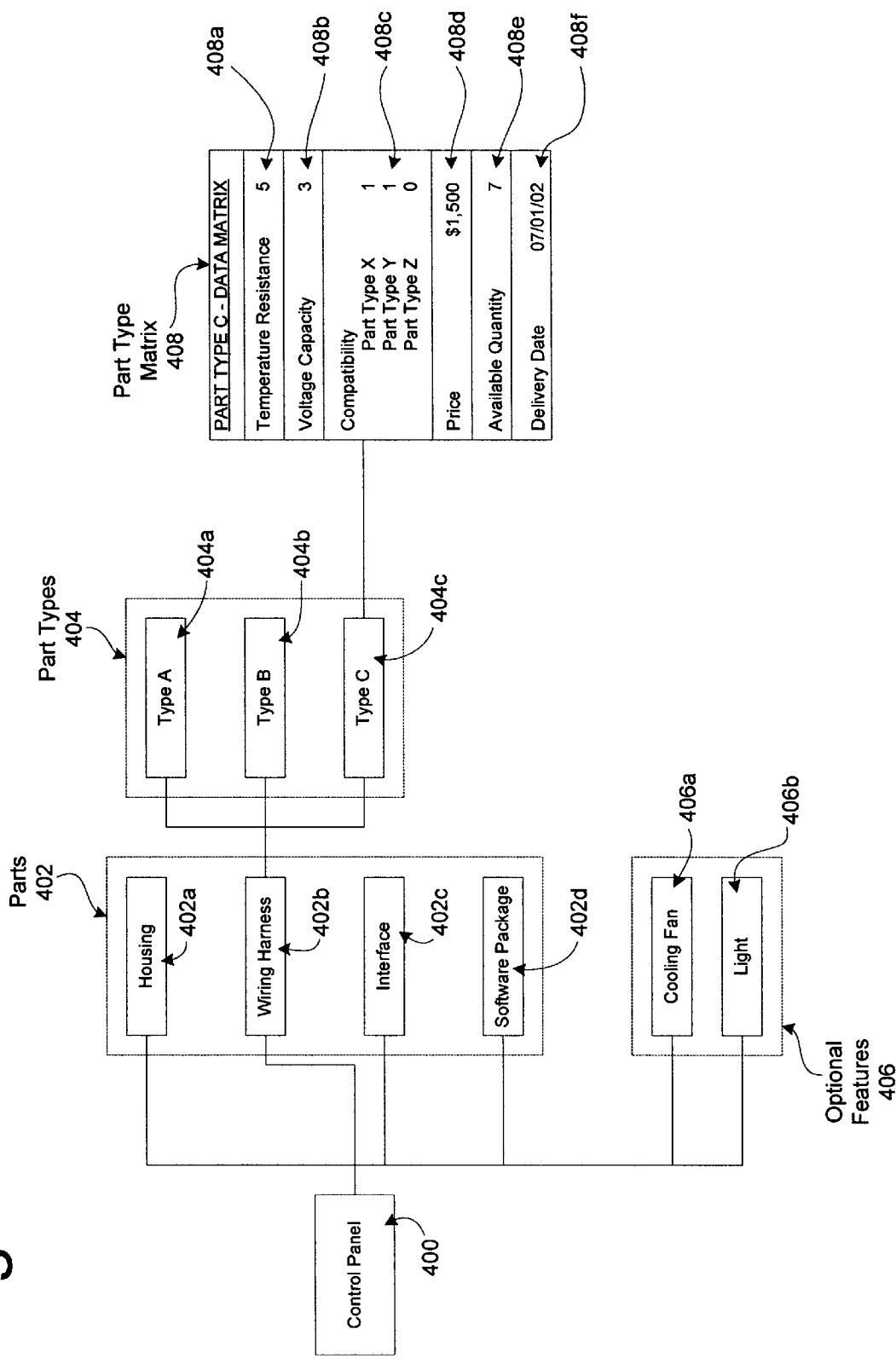
FIG. 4 is a schematic diagram showing an embodiment of the relationship between line items, parts, optional features and part types.

In step 314, the expansion module 206 identifies line items, such as control panel 400 of FIG. 4, in the translated data set. In the embodiment of FIG. 4, each line item represents an item requested in a purchase order. For example, a translated data set may have a first line item requesting a power system control panel 400, a second line item requesting a fuse breaker, and a third line item requesting connection hardware for a power inverter. The line items may be identified by, for example, a part number, a name, or both. Each line item may also contain other information, such as price, quantity, or desired date of receipt. If a line item can not be identified, then the expansion module 206 may send an error message, as described elsewhere and may continue with the remainder of the line items.

Each line item may reference a desired part using a term that describes a broad range of products and variations of products, which, in turn, may each include a number of components and features. For example, the term control panel may be used as a line item to broadly reference a combinations of many parts, which may be selected and assembled in different ways to provide control panels having different features, capabilities, compatibilities, costs, and the like. The use of a general descriptor is desirable because it allows the customer to place orders or requests using a relatively simple and convenient ordering system. However, such broad descriptors do not specifically indicate the various subassemblies and required parts at a level that fully conveys how to create and what to include in the desired part. When a customer in the present example orders a control panel, the expansion module 206 must expand this brief description into a detailed manufacturing request.

In step 316, the expansion module 206 identifies parts 404 corresponding to each line item by accessing a supplier database 224, a customer profile 220, an internal storage medium or other data source. The parts 402 corresponding to a line item are those parts or subassemblies that must be provided in order to produce a functioning example of the desired line item. Each part 402 may be identified by a generic descriptor, for example, a line item for an automobile may require parts such as a body, an engine, a drivetrain, and four wheels. Similarly, a control panel may have parts 402 such as a housing, a wiring harness, an instrument panel, a switchboard, input and output panels, and a software package. The actual item used as each part 402, referred to as a part type 404 herein, may vary between different applications. For example, the engine part of an automobile may be selected to have a different size depending on the automobile"s intended use, or the instrument panel part of a control panel may be selected to have different gauges depending on the control panel"s intended application.

Generally, a line item, such as a control panel 400, will always require the same set of generic parts 402, regardless of the particular application. Other parts may be available, however, as optional features 406. The relationship between the line item and the parts 402, the optional features 406, and the part types 404 is depicted schematically in FIG. 4.

In an embodiment in which the present invention is used to create a purchase or service request based on the customer data set 214, the present invention should select a single part type 404 that will be used for each part 402. A supplier may have many different part types 404 that each may be suitable to be selected as a part 402 under different circumstances. Several part types 404 may also be suitable to serve as the part 402 for a single application, but may offer different features or benefits. For example, a supplier may provide several shapes of housings that may be selected as the housing for a control panel. Each housing shape may be designed for a particular environment, but may work in other environments as well. In other cases, only a single part type 404 may be available or suitable to serve as a particular part 402. For example, a supplier may offer only one type of instrument panel for all control panels, or may only offer one type of panel that is suitable for the customer"s intended use.

In a simple purchase order scenario, the expansion module 206 should be adapted to select one part type 404 that will be used for each part 402. In order to select the proper part type 404 for the customer"s application, the expansion module 206 should determine which part types 404 are compatible with the customer"s system to ensure that the vendor provides the customer with parts or assemblies that the customer will be able to use. In addition, the expansion module 206 should determine which part types 404 are compatible with one another to ensure that the parts or assemblies will function together properly.

In step 318, the expansion module 206 compares the part types 404 with the customer"s system parameters, available in the customer profile 220, to determine which part types 404 are compatible with the customer"s intended use. For example, if the customer requests a control panel, the expansion module 206 might determine (in step 316) that the parts 402 of a control panel are: a housing (402*a*); a wiring harness (402*b*); an interface (402*c*); and a software package (402*d*).

Once the parts 402 have been identified, the expansion module 206 should determine what part types 404 are generally available to be used as each part 402 (step 318).

Continuing with the above example, the expansion module 206 may determine that the following part types 404 may be used as the wiring harness 402b for the control panel 400: wiring harness type A, with 3 inputs and 3 outputs (404a); wiring harness type B, with 2 inputs and 4 outputs (404b); wiring harness type C, with 3 inputs and 5 outputs (404c).

Listings for part types 404 may contain information that enables the expansion module 206 to identify particular features of each part type 404. This information may be provided in any number of ways. For example, each particular part type may provided with a matrix or table of information, such as the matrix 408 depicted in FIG. 4. This matrix 408 may indicate the particular part type"s performance capabilities, such as temperature resistance 408a, voltage capacity 408b and the like according to numerical values (e.g., 0–100 degrees Celsius; 10,000–20,000 Volts), or according to relative performance (e.g., high temperature resistance; high voltage capacity). This matrix 408 may also contain compatibility information 408c in binary terms by indicating whether the part type is or is not compatible with certain other part types. The matrix 408 may also contain sales features, such as a part type"s price 408d, available quantity 408e and available delivery date 408f. The expansion module 206 then use this information to establish certain useful data, such as the part type"s compatibilities, capabilities, prices, availability, and so on.

The list of part types 404 for a particular part 402 may be obtained, for example, from profile information or from accessing internal or external supplier databases 224. The supplier databases 224 may require connection to external devices or systems, or may be located locally on the expansion module 206 and require no external connection. In one embodiment of the invention, the expansion module 206 may query multiple supplier databases 224 to compile a list of part types 404 available for each part 402. The expansion module 206 may use dynamic polling to access the various data sources in real time, or may use scheduled polling to poll the various data sources according to a predetermined schedule, such as once every morning, to download all of the available information on to a local storage medium. A combination of dynamic and scheduled polling may also be employed.

Although this process has been shown in two steps for clarity (i.e., identify the parts 402, then identify available part types 404 for each part 402), in another embodiment, a supplier database 224 may return all of this information in response to a single query. For example, the expansion module 206 may query a supplier database 224 for a complete list of parts 402 necessary for a particular line item. The supplier database may return a detailed list of every part 402 that further includes all of the available part types 404 that may be used as each of the parts 402.

The expansion module 206 may then compare the part types 404 with the customer"s system parameters, customer profile 220, data set 214 or other sources to determine which part types 404 are most compatible with the customer"s system. The customer"s system parameters, as used herein, are the limitations and features of the customer"s system. For example, various customer system parameters may be that the customer system operates on a 60 Hz three-phase power supply, operates above a particular temperature, uses a particular operating system, and so on. Generally, failure to accommodate a system parameter when selecting the part type 404 may result in an supplying an incompatible product to the customer. A customer"s system parameters may change over time, and such changes are preferably updated in the customer profile 220 or provided in data sets 214.

In comparison step 318, the expansion module 206 compares the available part types 404 with the customer"s system parameters to ensure that the vendor will provide the customer with a product that will work with the customer"s system. In this step, the expansion module 206 removes from consideration those part types 404 that will not work with the customer"s system under any circumstances. For example, the customer profile 220 may indicate that the customer"s system has three input devices and three output devices, and therefore wiring harnesses A and C will be functioning part types 404 that may be used with the customer"s system, but harness B will not be compatible and should not be selected. Those part types 404 that are not compatible with the customer"s system 502 are removed from further consideration. Those variants that are compatible with the customer"s system are placed in a list of candidates 504 of functioning part types. The selection of part types 404 is shown in a Venn diagram in drawing FIG. 5.

After the expansion module 206 establishes a list of candidates 504 that may be used to fulfill the customer"s line item request, the expansion module 206 selects preferred candidates 506 for each part 402, in step 320. This selection may be performed by comparing each of the functioning part types in the list of candidates with the customer"s system preferences, which are available in the customer profile 220, the data set 214 or both. The customer"s system preferences, as used herein, comprise details about the customer"s generally preferred system or equipment features. For example, the customer"s system preferences may indicate that the customer prefers or does not prefer: expandability, cost savings, high technology, modular construction, serviceability, and so on. In contrast with the system parameters, the preferences are generally optional, and failure to accommodate a preference will not result in an incompatible product.

Continuing with the above example, the expansion module 206 may find that the customer profile 220 indicates that the customer prefers, for example, maximum expandability. Using this information, the expansion module 206 may be programmed to select wiring harness type C, with 5 outputs, as the preferred candidate 506 for the wiring harness. Wiring harness type A, which has only three outputs, may remain as a candidate 504, but not as a preferred candidate 506. In another embodiment, the expansion module may rank the candidates 504, instead of selecting a single part type 404 as the preferred candidate 506.

The expansion module 206 may also check the supplier database 224 to determine whether there are any optional features 406 available for the line item. The optional features 406 are additional items or features that may be included along with the parts 402 to make the line item, but that are not necessary to produce a functioning line item. For example, a control panel 400 may have, in addition to the housing 402a, wiring harness 402b, interface 402c, and software package 402d, the optional features 406 of a cooling fan 406a, and a light 406b. Like the parts 402, each optional feature 406 may have several part types 404 that may be used as each optional feature 406. For example, a requirement for an optional cooling fan 406a may be met by providing a relatively expensive quiet-running fan or a less expensive, but louder, fan. The expansion module 206 may then compare the part types available for these optional features 406 with the customer"s system preferences and select the appropriate part types to serve as the optional features 406. For example, the customer profile 220 may indicate that the system operates in a high temperature, low noise environment, and that the customer places a premium on low cost. In such a case, the expansion module 206 may use an algorithm to prioritize and select a part type as the optional feature 406. For example, the expansion module 206 may determine that a fan should be included to accommodate the high temperature environment (selecting compatibility over cost concerns), but that the louder fan will be given priority (selecting cost reduction over noise concerns) and added to the line item.

Once the expansion module 206 has compiled a list of candidates 504 and preferred candidates 506, it may select a particular combination of part types 404 that may be used to satisfy the customer"s line item request. In doing so, the expansion module 206 may compare the part types 404 that have been selected as preferred candidates 506 with one another to ensure that they are compatible. In some cases, the part types 404 selected as preferred candidates 506 for the parts 402 will be compatible with one another, in which case those part types 404 may be selected to fulfill the customer"s line item request. In some cases, however, a part type 404 that has been selected as the preferred candidate 506 for one part 402 may not be compatible with the part type 404 identified as a preferred candidate 506 for another part 402. For example, the expansion module might find that a particular housing and a particular interface would be preferred by the customer, but that they will not function together. In such a case, the expansion module 206 may resolve the conflict by selecting a different part type 402 from the candidate pool 504, rather than the preferred candidate 506, as one or more of the parts 402. If the expansion module 206 can not resolve these conflicts, then an error message may be generated, as described elsewhere herein. Once any such conflicts have been resolved, the expansion module 206 identifies the final candidates 508 that will be used to make each part 402 of the line item.

The expansion module 206 may also provide other operations to ensure that the line item is being filled in the most desirable manner. For example, the expansion module 206 may check one or more supplier databases 224 to ensure that the part types 404 that have been selected to fulfill a line item request will be available at the time required by the customer, which may be provided in the data set 214 or the customer profile 220. For example, wiring harness type C, although a preferred candidate 506, may not be available in time to be shipped to the customer at the requested time. In this case, the expansion module 206 may select a part type 404 from the candidate pool 504, such as wiring harness type A, if that part type 404 will be available in time. In another example, the expansion module 206 may check supplier databases 224 to determine whether the part types 404 are available for the price requested by the customer in the data set 214 or profile 220.

Any of the above functions may be performed using an iterative routine or other algorithm designed to match and prioritize various features of the candidates 504 and the preferred candidates 506 using the customer"s system preferences or other data provided in the data set 214, customer profile 220, supplier database 224 or other source.

Once a satisfactory combination of part types 404 has been selected to be used as the parts 402 (and optional parts 406, if any) of a line item, the expansion module 206 may store this information and continue to process additional line items. In addition, the above process of determining compatibility, availability, or providing other comparisons may be repeated at the line item level. For example, once part types 404 are selected for each line item, those part types 404 may be compared with the part types 404 selected for other line items to ensure that the line items will be functional together. It should also be understood that a particular part type 404 may be comprised of subparts, which may, in turn, have their own subparts. The above analysis may be used to determine subpart types that should be selected for each subpart, and this process may be repeated at any part level.

The above process continues until the expansion module 206 determines that there are no more line items in the data set 322. At this point, the expansion module 206 will have compiled a complete list of part types 404 that should be ordered, made, or assembled in order to fulfill the customer"s purchase order. Each part type 404 may be listed with a reference to the particular line item or part 402 with which it will be associated in the final product. In addition, the list of part types 404 may contain information regarding the particular manner in which the part types 404 interrelate, such as by providing assembly information.

In step 324 the expansion module 206 may then refer to one or more supplier databases 224 to establish a proposed manufacturing schedule 222 (schedule). The schedule 222 represents the fully-translated and expanded customer data set 216, and contains all of the necessary details to enable the vendor to provide goods or services to the customer to satisfy the customer"s request.

In the present embodiment, the schedule 222 indicates the details about each item that is being requested in the customer"s purchase order, including all of the parts and subassemblies of parts, and also contains information about when each part will be supplied, made, or assembled. The expansion module 206 may also evaluate the assembly sequence and optimize the assembly or manufacturing process to ensure that the customer"s order will be filled on time and at the lowest cost. In this case, the proposed manufacturing schedule 222 may include instructions or requirements to the suppliers indicating how to operate their facilities in order to fill the customer"s order. In another embodiment, the expansion module 206 simply checks supplier databases, such as a manufacturing plant schedule, to make sure that the order can be filled in time, and leaves the optimization and final scheduling processes to the supplier.

In one embodiment of the invention, upon completion the schedule 222 is sent to an approval agent 226 prior to being finalized (step 328). The approval agent 226, which may be an automated system or a human operator, checks the schedule 222 to ensure that it is correct. The approval agent 226 may analyze the schedule 222 by comparing it with a template or by performing a verification algorithm. The approval agent 226 may also present the schedule 222 to the vendor, the suppliers, or the customer for their approval/acceptance. For example, the approval agent 226 may present the schedule 222 to the supplier for the supplier to ensure that the it will be able to fulfill the requirements of the schedule 222. The approval agent 226 may also present the schedule 222 to the customer so that the customer can ensure that the schedule accurately reflects the customer"s request. Approval may be made by an automated system or by a manual operator.

If a schedule 222 is not approved, an error message, as described elsewhere herein, may be sent to the vendor system, the customer, or both. In such a case, the approval agent 226 may return the schedule 222 to the translation module 204 and the expansion module 206 for reanalysis in light of the disapproval.

Upon approval, the vendor system 100 may send the proposed manufacturing schedule 222 to an internal supplier or an external supplier (step 330). In one embodiment of the invention, the schedule 222 may be transmitted, in an electronic format, directly to supplier databases 208, 210. The supplier databases 208, 210 may be any suitable type of database, as previously discussed. In a preferred embodiment, the supplier databases 208, 210 are maintained by the suppliers, and the vendor has access to them for at least the purpose of depositing electronic files. One or more output databases 208, 210 may also be maintained on the vendor system 100. The vendor system 100 may also translate or otherwise reformat, compress, or prepare the data prior to transmitting it to the supplier databases 208, 210. In another embodiment of the invention, the schedule 222 may be transmitted to the suppliers using paper copies or other media.

In an embodiment of the invention in which the supplier is an internal supplier (i.e., affiliated with the vendor), the schedule 222 may be transmitted directly to an output database 208 operated by the internal supplier system 106. In such a case, the data transfer between the vendor system 100 and the internal supplier system 106 may be assumed to be secure, and it may be unnecessary to transmit the schedule 222 through a firewall 212. In other embodiments, or when an internal supplier is unable to meet the customer"s request, the suppliers may be external entities with no affiliation with the vendor. In these cases, the schedule 222 may be transferred through a firewall 212 to an output database on an external supplier"s system 210. In one embodiment, such as one in which the vendor system 100 is transmitting the schedule to an internal supplier, the proposed manufacturing schedule 222 may also be entered into the supplier"s database 208 as a complete and authorized manufacturing schedule, to which the supplier will conform without the option to refuse or modify the schedule 222.

The vendor system 100 may also notify the customer (step 332) that the customer data set 214 has been processed successfully. This may be performed by sending electronic mail notification to the customer, by sending a paper form to the customer, or by any other notification means.

While the above example generally discloses the use of the present invention for converting a customer"s relatively high-level purchase request in to a detailed manufacturing order, the present invention may also be used to process customer data sets to provide various other value-added features. Some examples of other features available from the present invention are provided below.

In one embodiment, the present invention may be used to convert a customer work request proposal or purchase order proposal into one or more pricing bids. For example, the expansion module 206 may convert the customer data set 214 into several requests for bids (instead of proposed manufacturing schedules 222) that are submitted to several different subcontractors or suppliers. The bid request submitted to each supplier may differ to some degree from other bids according, for example, to the particular products available from that supplier, particular contractual obligations between the vendor and the supplier, and so on. The vendor may then select from among the bids solicited by the bid requests to obtain the parts required to fulfill the customer"s purchase order or service request at the lowest cost to the vendor.

In another embodiment, the present invention may be used to upsell the customer"s purchase order or service request. For example, the expansion module 206 may use the customer profile 220 to identify upgrades and options that the customer may be interested in purchasing. The expansion module 206 may then present one or more upgrades to the customer for approval. In such an embodiment, the expansion module 206 may also be programmed to provide incentives, such as rebates or reduced prices, for purchasing options or upgrades. In yet another embodiment, the present invention may be used to adjust part pricing for each of the line items and necessary parts in order to sell the goods or services to the customer at a quoted price, while simultaneously accommodating the vendor"s other contractual obligations. For example, a vendor may have a contract to purchase a fixed quantity of goods from a vendor at a fixed price. Depending on the circumstances, the vendor may wish to quickly fulfill the obligation to purchase these parts, and so the expansion module 206 may be used to maximize the number of this particular part being sold to customers. Such an algorithm may also be used to exhaust unfavorably large inventory supplies. For example, the expansion module 206 may attempt to use a particular bolt, if possible, as much as possible when assembling proposed manufacturing schedules 222 in order to quickly exhaust the inventory of that bolt.

In still another embodiment, the present invention may be used to collate multiple purchase orders from multiple customers in order to purchase in bulk from suppliers. The proposed manufacturing schedules 222 may also be tailored to minimize storage-related expenses, such as by proposing bulk purchases with delayed shipping or distributing the requests among several suppliers to achieve simultaneous manufacturing.

In another embodiment, the present invention may be used to track customers, using their customer profiles 220 and updates to the customer profiles, to develop upgrading schedules for the customers, and otherwise stay abreast of the customers" requirements. For example, the expansion module 206 may be used to create an upgrading schedule that provides particular parts and assemblies to the customer in installments that are designed, for example, to minimize the cost to the customer. Using such a system, an antiquated machine or system may be upgraded piece-by-piece until it meets modern requirements without undue down time and without a large one-time expense to the customer.

The present invention may also be employed to provide a dynamic purchasing system. A dynamic purchasing system is one that allows a customer to modify a purchase request after it has been submitted and processing has begun. For example, a dynamic purchasing system may allow a customer to modify shipping dates, renegotiate prices, specify a new goods to be purchased, and perform other modifications. In one embodiment of the invention, a customer may designate a customer data set 214 as an addendum to a previously processed data set 214. When the retrieval agent 201 retrieves such a data set, it forwards it to a portion of the vendor system 100 that compares the addendum with the original data set and makes appropriate modifications. In a case where the customer"s order has been partially fulfilled, the vendor system 100 may disallow any modifications to the portions of the original data set 214 that have been fulfilled, but may forward the remainder of the addendum to the expansion module 206 for processing into a new partial expanded data set. To do so, the vendor system 100 may be adapted to query internal and external supplier systems 106, 108 to determine which portions of the customer"s request have already been fulfilled.

Other uses for the present invention will be apparent to those skilled in the art. The exemplary embodiments described herein have been broken down into various steps for purposes of clarity, and the invention should not be understood to be limited to the described embodiments. It should be understood that the steps described in the above embodiments may be combined, reordered, or deleted without falling outside the scope of the invention. In addition, it will be obvious to a skilled artisan that the retrieval agent 201, translation module, expansion module 206, and approval agent 226 may all be combined into one integrated software package or into combinations of sub-programs.

While the foregoing description includes many details and specifics, it should be understood that these have been included for purposes of explanation only, and should not be interpreted as limitations of the present invention. Many modifications to the embodiments described above can be made without departing from the spirit and scope of the invention, as is intended to be encompassed by the following claims and their legal equivalents.

We claim:

1. An electronic form processing system comprising:
   one or more vendor computers adapted to communicate with at least one customer computer, and being adapted to access supplier data;
   one or more first storage devices having customer-formatted data sets stored therein;
   a retrieval agent for retrieving at least one customer-formatted data set representing customer electronic form information from the customer computer, said customer electronic form information comprising an incomplete request;
   an expansion module adapted to convert the customer-formatted data set and generate an expanded data set at least in part by referring to supplier data;
   wherein the expanded data set represents an essentially complete request.

2. The system of claim 1, further comprising:
   one or more second storage devices having customer profile data stored therein; and
   wherein the expansion module is further adapted to convert the customer-formatted data set and generate an expanded data set by referring to customer profile data.

3. The system of claim 2, wherein at least one of the first storage devices and at least one of the second storage devices are the same.

4. The system of claim 2, wherein at least one of the one or more first and second storage devices is a remote storage device accessible by at least one vendor computer to obtain one or more customer-formatted data sets.

5. The system of claim 2, wherein at least one of the first and second storage devices is at least partially operated by at least one customer computer.

6. The system of claim 2, wherein the customer profile data comprises at least one of customer system parameters and customer system preferences.

7. The system of claim 1, wherein the customer-formatted data sets associated with each of the one or more customer computers has a format unique to that customer computer.

8. The system of claim 1, wherein the electronic form information comprises one or more purchase orders, each comprising a list of one or more line items.

9. The system of claim 1, wherein the customer-formatted data sets comprise high level product requests and the expanded data comprises one or more detailed product descriptions.

10. The system of claim 9, wherein the expanded data further comprises at least one of manufacturing scheduling information, pricing information, and shipping information.

11. The system of claim 1, wherein the retrieval agent is adapted to retrieve updated customer formatted data and at least one of the vendor computers is adapted to alter the expanded data to at least partially conform with the updated customer-formatted data.

12. A method for processing electronic form information comprising:
   adapting one or more vendor computers to communicate with at least one customer computer;
   adapting the one or more vendor computers to access supplier data;
   retrieving at least one customer-formatted data set representing customer electronic form information from one or more first storage devices;
   obtaining supplier data from one or more supplier databases;
   converting the customer-formatted data set into an expanded data set at least in part by referring to the supplier data;
   wherein the customer electronic form information comprises an incomplete request and the expanded data set comprises an essentially complete request.

13. The method of claim 12, further comprising:
   rDocXGoBackHereDocXGoBackHereetrieving customer profile data from one or more second storage devices; and
   wherein converting the customer-formatted data set into an expanded data set further comprises referring to the customer profile data.

14. The method of claim 13, wherein at least one of the first storage devices and at least one of the second storage devices are the same.

15. The method of claim 13, wherein at least one of the one or more first and second storage devices is a remote storage device accessible by at least one vendor computer to obtain one or more customer-formatted data sets.

16. The method of claim 13, wherein at least one of the first and second storage devices is at least partially operated by at least one customer computer.

17. The method of claim 13, wherein the customer profile data comprises at least one of customer system parameters and customer system preferences.

18. The method of claim 12, wherein the customer-formatted data sets associated with each of the one or more customer computers has a format unique to that customer computer.

19. The method of claim 12, wherein the electronic form information comprises one or more purchase orders, each comprising a list of one or more line items.

20. The method of claim 12, wherein the customer-formatted data sets comprise high level product requests and the expanded data comprises one or more detailed product descriptions.

21. The method of claim 20, wherein the expanded data further comprises at least one of manufacturing scheduling information, pricing information, and shipping information.

22. The method of claim 12, further comprising:
   retrieving updated customer-formatted data; and
   updating the expanded data to at least partially conform with the updated customer-formatted data.

23. A method for upselling a customer purchase request comprising:
   adapting one or more vendor computers to communicate with a customer computer;
   retrieving one or more customer-formatted data sets representing customer electronic purchase request form information from one or more storage devices;

retrieving customer profile data from one or more second storage devices;

obtaining supplier data;

converting the customer-formatted data into an expanded data set at least in part by referring to at least one of the customer profile data and the supplier data;

wherein the customer electronic form information comprises an incomplete request and the expanded data set comprises an essentially complete request having at least one optional feature.

24. An electronic form processing system comprising:

one or more vendor computers adapted to communicate with at least one customer computer, and being adapted to access supplier data;

one or more first storage devices having customer-formatted data sets stored therein;

one or more second storage devices having customer profile data stored therein;

a retrieval agent for retrieving at least one customer-formatted data set representing customer electronic form information from the customer computer, said customer electronic form information comprising an incomplete request;

an expansion module adapted to convert the customer-formatted data set and generate an expanded data set at least in part by referring to at least one of customer profile data and supplier data;

wherein the expanded data set represents an essentially complete request.

* * * * *

UNITED STATES PATENT AND TRADEMARK OFFICE
CERTIFICATE OF CORRECTION

PATENT NO.    : 6,549,906 B1
DATED         : June 6, 2003
INVENTOR(S)   : Michael E. Austin and Scott D. Waun It is certified that error appears in the above-identified patent and that said Letters Patent is hereby corrected as shown below:

Column 1,
Lines 22 and 24, replace "customer"s" with -- customer's --
Lines 43, 46, 49 and 50, replace "business"s" with -- business's --

Column 2,
Lines 3, 29 and 58, replace "customer"s" with -- customer's --
Line 5, replace "customers"" with -- customers' --
Line 12, replace "business"s" with -- business's --

Column 4,
Line 54, replace "customer"s" with -- customer's --
Line 54, replace "vendor"s" with -- vendor's --

Column 5,
Line 24, replace "customer"s" with -- customer's --
Line 24, replace "vendor"s" with -- vendor's --

Column 6,
Lines 7, 40, 53 and 55, replace "customer"s" with -- customer's --

Column 7,
Line 5, replace "Microsoft"s" with -- Microsoft's --
Line 6, replace "Java"s" with -- Java's --
Line 64, replace "vendor"s" with -- vendor's --
Line 65, replace "customer"s" with -- customer's --

Column 8,
Lines 8 and 9, replace "customer"s" with -- customer's --
Lines 16, 43 and 58, replace "vendor"s" with -- vendor's --

Column 9,
Lines 8, 56, 57, 61 and 65, replace "customer"s" with -- customer's --
Lines 21, 60 and 63, replace "vendor"s" with -- vendor's --

Column 10,
Lines 8, 31, 42, 45, 58, 60 and 63, replace "customer"s" with -- customer's --
Line 33, replace "vendor"s" with -- vendor's --

UNITED STATES PATENT AND TRADEMARK OFFICE
CERTIFICATE OF CORRECTION

PATENT NO.      : 6,549,906 B1
DATED           : June 6, 2003
INVENTOR(S)     : Michael E. Austin and Scott D. Waun It is certified that error appears in the above-identified patent and that said Letters Patent is hereby corrected as shown below:

Column 11,
Line 14, replace "customers"" with -- customers' --
Lines 16, 19, 20 and 22, replace "customer"s" with -- customer's --
Line 17, replace "vendor"s" with -- vendor's --

Column 12,
Lines 8 and 18, replace "customer"s" with -- customer's --

Column 14,
Line 19, replace "automobile"s" with -- automobile's --
Line 21, replace "panel"s" with -- panel's --
Lines 44, 48, 50, 57 and 59, replace "customer"s" with -- customer's --

Column 15,
Lines 13, 22 and 25, replace "type"s" with -- type's --
Lines 54, 56, 57, 58 and 65, replace "customer"s" with -- customer's --

Column 16,
Lines 2, 4, 7, 9, 12, 14, 16, 21, 25, 27, 28, 30 and 64, replace "customer"s" with -- customer's --

Column 17,
Lines 13, 20 and 56, replace "customer"s" with -- customer's --

Column 18,
Lines 13, 25, 28, 33, 37 and 57, replace "customer"s" with -- customer's --

Column 19,
Lines 24, 42, 61 and 64, replace "customer"s" with -- customer's --
Lines 28 and 32, replace "supplier"s" with -- supplier's --

Column 20,
Line 9, replace "vendor"s" with -- vendor's --
Lines 34, 55 and 62, replace "customer"s" with -- customer's --

UNITED STATES PATENT AND TRADEMARK OFFICE
CERTIFICATE OF CORRECTION

PATENT NO. : 6,549,906 B1
DATED : June 6, 2003
INVENTOR(S) : Michael E. Austin and Scott D. Waun It is certified that error appears in the above-identified patent and that said Letters Patent is hereby corrected as shown below:

<u>Column 22,</u>
Line 23, replace "rDocXGoBackHereDocXGoBackHereetrieving" with -- retrieving --

Signed and Sealed this

Fifteenth Day of July, 2003

JAMES E. ROGAN
*Director of the United States Patent and Trademark Office*